US008755417B1

(12) United States Patent
Dribinski

(10) Patent No.: US 8,755,417 B1
(45) Date of Patent: Jun. 17, 2014

(54) COHERENT LIGHT GENERATION BELOW ABOUT TWO-HUNDRED NANOMETERS

(75) Inventor: Vladimir L. Dribinski, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 11/735,967

(22) Filed: Apr. 16, 2007

(51) Int. Cl.
*H01S 3/10* (2006.01)

(52) U.S. Cl.
USPC ............................................. 372/22; 372/21

(58) Field of Classification Search
CPC ....... H01S 3/0092; H01S 3/109; H01S 3/108; H01S 3/005; H01S 3/1121; H01S 3/302; H01S 3/30
USPC ..................................................... 372/22, 21
See application file for complete search history.

(56) References Cited

U.S. PATENT DOCUMENTS

| 5,144,630 | A  | * | 9/1992  | Lin ............................... 372/22 |
| 6,212,310 | B1 | * | 4/2001  | Waarts et al. ................... 385/24 |
| 6,498,801 | B1 |   | 12/2002 | Dudelzak et al. |
| 7,623,557 | B2 |   | 11/2009 | Tokuhisa et al. |
| 2005/0157382 | A1 | * | 7/2005 | Kafka et al. .................. 359/346 |
| 2006/0171656 | A1 | * | 8/2006 | Adachi et al. ................. 385/147 |
| 2007/0211773 | A1 | * | 9/2007 | Gerstenberger et al. ........ 372/22 |

OTHER PUBLICATIONS

J. Sakuma, A. Finch, Y. Ohsako, K. Deki, M. Horiguchi, T. Yokota, Y. Mori, T. Sasaki, "High power, narrowband, DUV laser source by frequency mixing in CLBO," Advanced High-Power Lasers and Applications, vol. 20, 7-14(2000).
T. Sasaki, Y. Mori, M. Yoshimura, "Progress in the growth of a CsLiB6O10 crystal and its application to ultraviolet light generation," Optical Materials, vol. 23, 343-351(2003).

* cited by examiner

*Primary Examiner* — Kinam Park
(74) *Attorney, Agent, or Firm* — Luedeka Neely Group, P.C.; Rick Barnes

(57) ABSTRACT

A method for producing light energy, where fundamental frequency laser energy is produced at a wavelength of from about 1,160 nanometers to about 1,170 nanometers. Portions of the fundamental frequency laser energy are combined to produce a second harmonic frequency laser energy using non-critical phase-matching in a LBO crystal. A portion of the fundamental frequency laser energy is combined with a portion of the second harmonic frequency laser energy to produce a third harmonic frequency laser energy. A portion of the second harmonic frequency laser energy is combined with the third harmonic frequency laser energy to produce a fifth harmonic frequency laser energy using non-critical phase-matching in a CLBO crystal. A portion of the fundamental frequency laser energy is combined with the fifth harmonic frequency laser energy to produce a sixth harmonic frequency laser energy using a CLBO crystal. The sixth harmonic frequency laser energy has a wavelength that is less than about two hundred nanometers.

15 Claims, 3 Drawing Sheets

COHERENT LIGHT GENERATION BELOW ABOUT TWO-HUNDRED NANOMETERS

FIELD

This invention relates to the field of illuminators used in conjunction with inspection systems, such as substrate inspection systems and photomask inspection systems. More particularly, this invention relates to a laser light source for use with such inspection systems.

BACKGROUND

As the features sizes of integrated circuits continue to decrease, the integrated circuit fabrication industry requires inspection tools with higher resolution, so as to resolve the smaller features of the circuits. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

An improvement in the resolution of an inspection system can be achieved by using light sources that have shorter wavelengths than those currently employed. However, the choice of suitable sources, generally lasers, is very limited because the inspection system typically requires a laser with a high average power, but a low peak power. Additionally, performance stability—as well as costs of operation and maintenance—is of crucial importance.

Designing a laser that satisfies the above conditions becomes particularly challenging at wavelengths shorter than about two hundred nanometers. In general, there are two approaches to generating laser light below about two hundred nanometers, which is generally referred to herein as short wavelength light.

First, short wavelength light can be obtained directly from an excimer laser, such as an ArF excimer laser, which generally emits radiation with a wavelength of about 193 nanometers. Unfortunately, although these lasers operate at a desirably high average power, they also operate with relatively low repetition rates (up to about ten kilohertz), that tends to produce an extremely high peak power level, which is sufficient to damage most substrates and masks. In addition, industrial excimer lasers are usually very large and require extensive maintenance. Therefore, such lasers are of little use for most integrated circuit inspection systems.

Second, short wavelength light can be produced by a longer wavelength light source using a method called frequency conversion. This method involves one or more laser sources and a series of non-linear crystals, in which the conversion takes place. Currently available light sources, such as solid state lasers and fiber lasers, are capable of producing high-quality laser light in a wide range of output powers and repetition rates. However, the light that is generated by these sources is in the near-infrared range. Thus, multiple frequency conversion stages are required to produce short wavelength light.

Unfortunately, each of these multiple conversion stages reduces the output power of the laser, because the conversion efficiency of each stage tends to be significantly less than one. Furthermore, each frequency conversion stage tends to degrade the output beam quality, due to effects such as the spatial walk-off, and creates additional problems by increasing the number of elements of the system. For these reasons, it is vital to minimize the number of frequency conversion steps and to make every step as efficient as possible by using the most suitable crystals and specific wavelength combinations that produce the best results.

For example, several frequency-converting lasers that produce light at wavelengths below about two hundred nanometers have been demonstrated in the past. Most of them use more than one fundamental light source, such as two Nd:YAGs and Ti:$Al_2O_3$, two Nd:YLFs and Ti:$Al_2O_3$, Nd:YLF and OPO, and four or five frequency conversion stages. These devices are too complicated for use in an industrial inspection system.

The only system that uses a single fundamental infrared source includes a diode-pumped Er-doped fiber amplifier, whose 1,547 nanometer infrared output is frequency converted to produce an eighth harmonic at about 193 nanometers. The wavelength transformation is accomplished with five non-linear crystals. Among the drawbacks of this system are a low conversion efficiency and a poor beam quality that are caused by the frequency-converting crystals, as well as by thermal instabilities, due to the fact that in order to perform frequency conversion, some of the crystals have to be kept at high temperatures, above about 115° C.

What is needed, therefore, is a system that overcomes problems such as those described above, at least in part.

SUMMARY

The above and other needs are met by a method for producing light energy, where fundamental frequency laser energy is produced at a wavelength of from about 1,160 nanometers to about 1,170 nanometers. A portion of the fundamental frequency laser energy is converted into a second harmonic frequency laser energy using non-critical phase-matching in a LBO crystal. A portion of the fundamental frequency laser energy is combined with a portion of the second harmonic frequency laser energy to produce a third harmonic frequency laser energy. A portion of the second harmonic frequency laser energy is combined with the third harmonic frequency laser energy to produce a fifth harmonic frequency laser energy using non-critical phase-matching in a CLBO crystal. A portion of the fundamental frequency laser energy is combined with the fifth harmonic frequency laser energy to produce a sixth harmonic frequency laser energy using a CLBO crystal. The sixth harmonic frequency laser energy has a wavelength that is less than about two hundred nanometers.

In various embodiments, the fundamental frequency laser energy is generated by at least one of a fiber laser, a semiconductor diode laser, or a Raman laser. The combining of the second stage is accomplished using at least one of a BBO crystal, a CBO crystal, a LBO crystal, a CLBO crystal, and a periodically-polled material. In some embodiments, three independent amplifiers are used to supply undepleted fundamental frequency laser energy to the first stage, the second stage, and the fourth stage. In other embodiments, three independent Raman shifters are used to supply undepleted fundamental frequency laser energy to the first stage, the second stage, and the fourth stage.

According to another aspect of the invention, there is described a method for producing light energy, by generating a first fundamental frequency laser energy at a wavelength of from about 1,100 nanometers to about 1,110 nanometers. A portion of the first fundamental frequency laser energy is shifted to a second fundamental laser energy at a Raman line with a wavelength of from about 1,160 nanometers to about 1,170 nanometers. Portions of the second fundamental frequency laser energy are combined to produce a second harmonic frequency laser energy using non-critical phase-matching in a LBO crystal. A portion of the second fundamental frequency laser energy is combined with a portion of the second harmonic frequency laser energy to produce a third harmonic frequency laser energy. A portion of the second harmonic frequency laser energy is combined with the third harmonic frequency laser energy to produce a fifth harmonic frequency laser energy using non-critical phase-matching in a CLBO crystal. A portion of the first fundamental frequency laser energy is combined with the fifth harmonic frequency laser energy to produce a sum frequency laser energy using non-critical phase-matching in a CLBO crystal. The sum frequency laser energy has a wavelength that is less than about two hundred nanometers.

The advantages of new frequency conversion schemes described herein include, but are not limited to:
(i) fewer elements in the design in comparison to prior art,
(ii) the use of fundamental frequency light in the first, second, and forth conversion stages results in higher conversion efficiency.
(iii) extensive use of non-critical phase matching allows for increased conversion efficiency and improves output beam quality; and
(iv) lower operating temperatures alleviate thermal problems.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The efficiency of the frequency conversion process inside of a non-linear crystal depends on the properties of the crystal, which are very wavelength-sensitive. Thus, in order to achieve highly-efficient frequency conversion, one has to tailor the conversion method to match the properties of the particular non-linear crystals.

Figure 1:
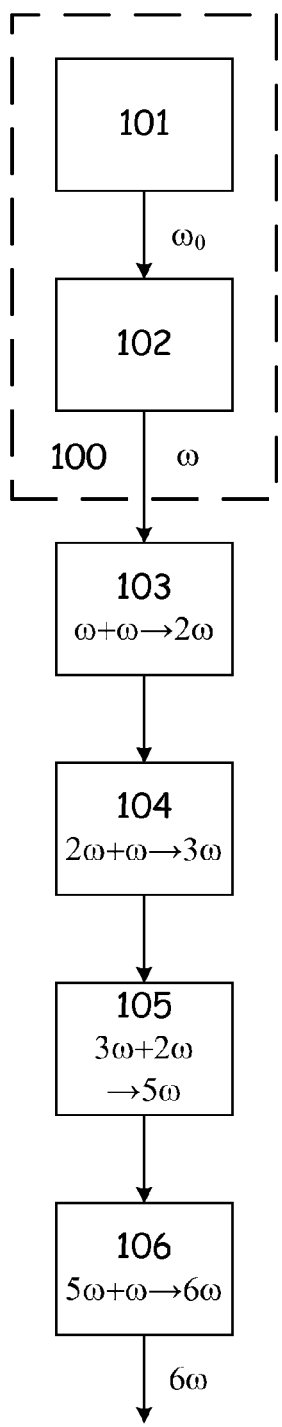
FIG. 1 depicts a system according to a first embodiment of the present invention, having a fundamental light source and four non-linear crystals acting as frequency conversion stages.

The first embodiment of the present invention is illustrated in FIG. 1. The fundamental light ($\omega$) is generated by a light source 100 that includes a laser source 101 operating at $\omega_0$ of about 1,053 nanometers to about 1,064 nanometers, and a Raman shifter 102 based on a crystal such as potassium gadolinium tungstate [$KGd(WO_4)_2$ (KGW)], barium nitrate [$Ba(NO_3)_2$], or similar solid-state Raman shifter crystal. Alternately, a fiber laser is used as a fundamental source 100. In this case element 101 represents, for example, a Yb-doped fiber oscillator/preamplifier, and element 102 is a Raman fiber, such as Ge-doped or P-doped fiber.

The fundamental frequency output $\omega$ is directed into the first non-linear crystal 103, lithium triborate [$LiB_3O_5$ (LBO)], which is non-critically phase-matched at a temperature of about fifty degrees Celsius, and converts a portion of the fundamental wavelength $\omega$ into second harmonic light $2\omega$. The second harmonic $2\omega$ recombines with the unconverted fundamental light $\omega$ in the second crystal 104, which can be LBO, cesium lithium borate [$CsLiB_6O_{10}$ (CLBO)], beta-barium borate [$\beta\text{-}BaB_2O_4$ (BBO)], or similar crystal. As a result, a 3rd harmonic frequency $3\omega$ is produced. The remaining portions of the second harmonic light $2\omega$ and the third harmonic light $3\omega$ are mixed in the third crystal 105, CLBO, which is non-critically phase matched at a temperature of about thirty degrees Celsius to about sixty-five degrees Celsius, and produces a fifth harmonic frequency light $5\omega$. Finally, the fifth harmonic light $5\omega$ is mixed with the remaining fundamental light $\omega$ in the fourth crystal 106, CLBO, generating a sixth harmonic light $6\omega$, having a short wavelength, which as defined above, means a wavelength of less than about two hundred nanometers.

Figure 2:
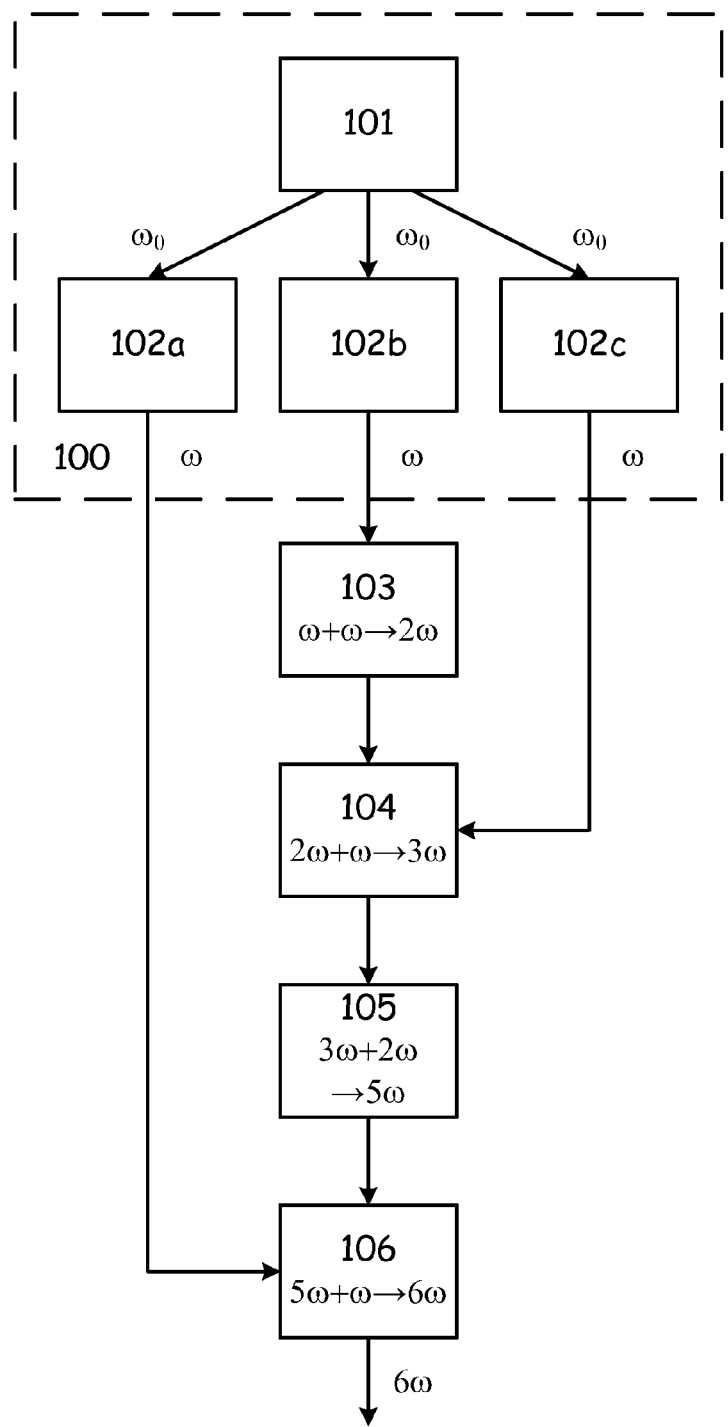
FIG. 2 depicts a system according to a second embodiment of the present invention, having a fundamental light source with three separate fundamental wavelength generators that are used independently for the first, second, and forth conversion stages.

A second embodiment is depicted in FIG. 2. The second embodiment uses the same frequency conversion stages 103-106 as described in the first embodiment, but with a fundamental light source 100 having three independent final amplifiers 102a-102c. This embodiment uses undepleted fundamental light $\omega$ at every stage 103, 104, and 106 where the fundamental wavelength $\omega$ is needed, thus increasing the efficiency of these stages by providing more input laser power. This system is especially well-suited for fiber-based laser sources, in which multiple amplifier configurations are easy to implement.

Figure 3:
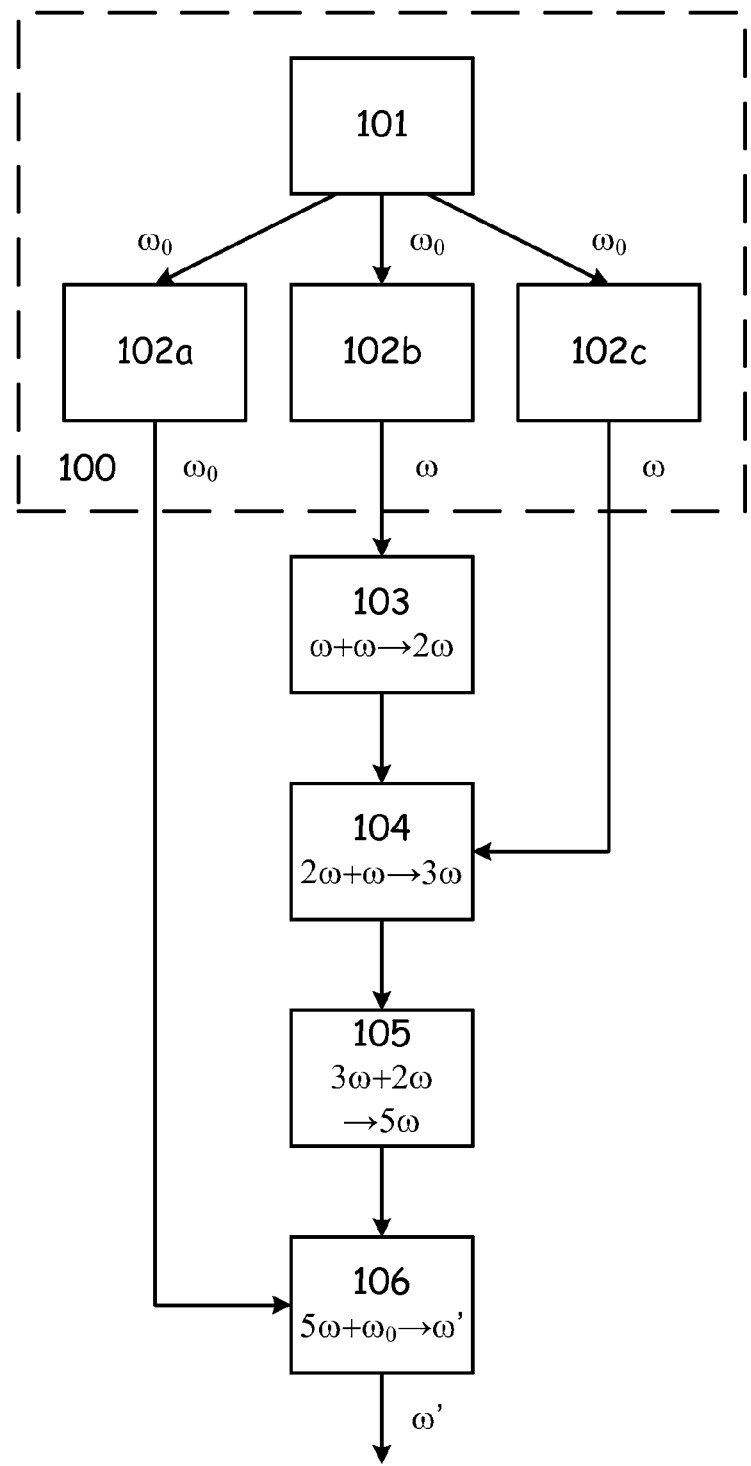
FIG. 3 depicts a system according to a third embodiment of the present invention, having a fundamental light source with two different wavelength outputs.

A third embodiment is depicted in FIG. 3. This embodiment is different from the second embodiment in that one of the amplifiers 102a produces unshifted fundamental frequency light $\omega_0$, while the two other amplifiers 102b and 102c provide the Raman-shifted output $\omega$. Therefore, a two-wavelength fundamental source 100 is provided. By using the same non-linear crystals as those described in the above embodiments, a fifth harmonic frequency light $5\omega$ is produced through the first three stages 103-105, in the manner described above. Thereafter, the fifth harmonic light $5\omega$ is mixed with the unshifted fundamental light $\omega_0$ in the fourth stage 106 to produce $\omega'=5\omega+\omega_0$. One primary advantage of this system is an additional flexibility that allows the last CLBO crystal 106 to be used in a non-critical phase-matching regime, in addition to the already non-critically phase-matched LBO stage 103 and CLBO stage 105.

Example of the First and Second Embodiments

1. Fundamental wavelength $\omega$=1,166 nanometers.
2. First conversion stage: LBO, non-critical phase matching at T=48.3° C.; output $2\omega$=583 nanometers.
3. Second conversion stage: LBO, critical phase matching; output $3\omega$=388.7 nanometers.
4. Third conversion stage: CLBO, non-critical phase matching at T=54.0° C.; output $5\omega$=233.2 nanometers.
5. Forth conversion stage: CLBO, critical phase matching; output $6\omega$=194.3 nanometers.

Example of the Third Embodiment

1. Fundamental wavelengths $\omega_0$=1,104 nanometers, $\omega$=1,166 nanometers.
2. First conversion stage: LBO, non-critical phase matching at T=48.3° C.; output $2\omega$=583 nanometers.

3. Second conversion stage: LBO, critical phase matching; output 3ω=388.7 nanometers.
4. Third conversion stage: CLBO, non-critical phase matching at T=54.0° C.; output 5ω=233.2 nanometers.
5. Forth conversion stage: CLBO, non-critical phase matching at T=62.4° C.; output ω'=192.5 nanometers.

The phase-matching conditions are calculated based on published LBO and CLBO data.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for producing light energy, comprising:
    generating a first fundamental frequency laser energy at a wavelength of from about 1,100 nanometers to about 1,110 nanometers,
    shifting the first fundamental frequency laser energy to a second fundamental laser energy with a wavelength of from about 1,160 nanometers to about 1,170 nanometers,
    in a first stage, combining portions of the second fundamental frequency laser energy to produce a second harmonic frequency laser energy,
    in a second stage, combining a portion of the second fundamental frequency laser energy and a portion of the second harmonic frequency laser energy to produce a third harmonic frequency laser energy,
    in a third stage, combining a portion of the second harmonic frequency laser energy and the third harmonic frequency laser energy to produce a fifth harmonic frequency laser energy using non-critical phase-matching in a CLBO crystal, and
    in a fourth stage, combining a portion of the second fundamental frequency laser energy and the fifth harmonic frequency laser energy to produce a sixth harmonic frequency laser energy using a CLBO crystal,
    wherein,
        the first fundamental frequency laser energy is generated by a fiber laser,
        the shifting uses a Raman fiber,
        the combining of the first stage is accomplished using at least one of a BBO crystal, a CBO crystal, a LBO crystal, a CLBO crystal, and a periodically-polled material, and
        the sixth harmonic frequency laser energy has a wavelength that is less than about two hundred nanometers.
2. The method of claim 1 where the first fundamental frequency laser energy is generated by a Raman laser.
3. The method of claim 1 wherein the combining of the second stage is accomplished using at least one of a BBO crystal, a CBO crystal, a LBO crystal, a CLBO crystal, and a periodically-polled material.
4. The method of claim 1 wherein three independent amplifiers are used to supply undepleted second fundamental frequency laser energy to the first stage, the second stage, and the fourth stage.
5. The method of claim 1 wherein three independent Raman shifters are used to supply undepleted second fundamental frequency laser energy to the first stage, the second stage, and the fourth stage.
6. The method of claim 1 wherein the fundamental second frequency laser energy is adjusted to match the non-critical phase-matching of the third stage.
7. A method for producing light energy, comprising:
    generating a first fundamental frequency laser energy at a wavelength of from about 1,100 nanometers to about 1,110 nanometers,
    shifting a portion of the first fundamental frequency laser energy to a second fundamental laser energy with a wavelength of from about 1,160 nanometers to about 1,170 nanometers,
    in a first stage, combining portions of the second fundamental frequency laser energy to produce a second harmonic frequency laser energy,
    in a second stage, combining a portion of the second fundamental frequency laser energy and a portion of the second harmonic frequency laser energy to produce a third harmonic frequency laser energy,
    in a third stage, combining a portion of the second harmonic frequency laser energy and the third harmonic frequency laser energy to produce a fifth harmonic frequency laser energy using non-critical phase-matching in a CLBO crystal, and
    in a fourth stage, combining a portion of the first fundamental frequency laser energy and the fifth harmonic frequency laser energy to produce a sum frequency laser energy using non-critical phase-matching in a CLBO crystal,
    wherein,
        the first fundamental frequency laser energy is generated by a fiber laser,
        the shifting uses a Raman fiber,
        the combining of the first stage is accomplished using at least one of a BBO crystal, a CBO crystal, a LBO crystal, a CLBO crystal, and a periodically-polled material, and
        the sum frequency laser energy has a wavelength that is less than about two hundred nanometers.
8. The method of claim 7 wherein the first and second fundamental laser energies are adjusted to match the non-critical phase-matching of the third and forth stages.
9. An apparatus for producing light energy, comprising:
    a light source comprising a fiber laser that generates a first fundamental frequency laser energy at a wavelength of from about 1,100 nanometers to about 1,110 nanometers,
    a Raman fiber for shifting the first fundamental frequency laser energy to a second fundamental laser energy with a wavelength of from about 1,160 nanometers to about 1,170 nanometers,
    a first stage for combining portions of the second fundamental frequency laser energy to produce a second harmonic frequency laser energy using at least one of a BBO crystal, a CBO crystal, a LBO crystal, a CLBO crystal, and a periodically-polled material,
    a second stage for combining a portion of the second fundamental frequency laser energy and a portion of the second harmonic frequency laser energy to produce a third harmonic frequency laser energy, a third stage for combining a portion of the second harmonic frequency laser energy and the third harmonic frequency laser energy to produce a fifth harmonic frequency laser energy using non-critical phase-matching in a CLBO crystal, and a fourth stage for combining a portion of the second fundamental frequency laser energy and the fifth harmonic frequency laser energy to produce a sixth harmonic frequency laser energy using a CLBO crystal, wherein the sixth harmonic frequency laser energy has a wavelength that is less than about two hundred nanometers.

10. The apparatus of claim 9, wherein the light source includes at least one of a semiconductor diode laser and a Raman laser.

11. The apparatus of claim 9, wherein the second stage comprises at least one of a BBO crystal, a CBO crystal, a LBO crystal, a CLBO crystal, and a periodically-polled material.

12. The apparatus of claim 9, further comprising three independent amplifiers to supply the second fundamental frequency laser energy to the first stage, the second stage, and the fourth stage.

13. The apparatus of claim 9, further comprising three independent Raman shifters to supply the second fundamental frequency laser energy to the first stage, the second stage, and the fourth stage.

14. The apparatus of claim 9, wherein the second fundamental frequency laser energy is adjusted to match the non-critical phase-matching of the third stage.

15. An apparatus for producing light energy, comprising:

a light source comprising a fiber laser that generates a first fundamental frequency laser energy at a wavelength of from about 1,100 nanometers to about 1,110 nanometers, a Raman fiber for shifting a portion of the first fundamental frequency laser energy to a second fundamental laser energy with a wavelength of from about 1,160 nanometers to about 1,170 nanometers, a first stage for combining portions of the second fundamental frequency laser energy to produce a second harmonic frequency laser energy using at least one of a BBO crystal, a CBO crystal, a LBO crystal, a CLBO crystal, and a periodically-polled material, a second stage for combining a portion of the second fundamental frequency laser energy and a portion of the second harmonic frequency laser energy to produce a third harmonic frequency laser energy, a third stage for combining a portion of the second harmonic frequency laser energy and the third harmonic frequency laser energy to produce a fifth harmonic frequency laser energy using non-critical phase-matching in a CLBO crystal, and a fourth stage, combining a portion of the first fundamental frequency laser energy and the fifth harmonic frequency laser energy to produce a sum frequency laser energy using non-critical phase-matching in a CLBO crystal, wherein the sum frequency laser energy has a wavelength that is less than about two hundred nanometers.

* * * * *